Oct. 23, 1956 J. D. SARTAKOFF 2,768,106
METHOD OF MAKING A CARBOY
Filed Sept. 19, 1950 5 Sheets-Sheet 1
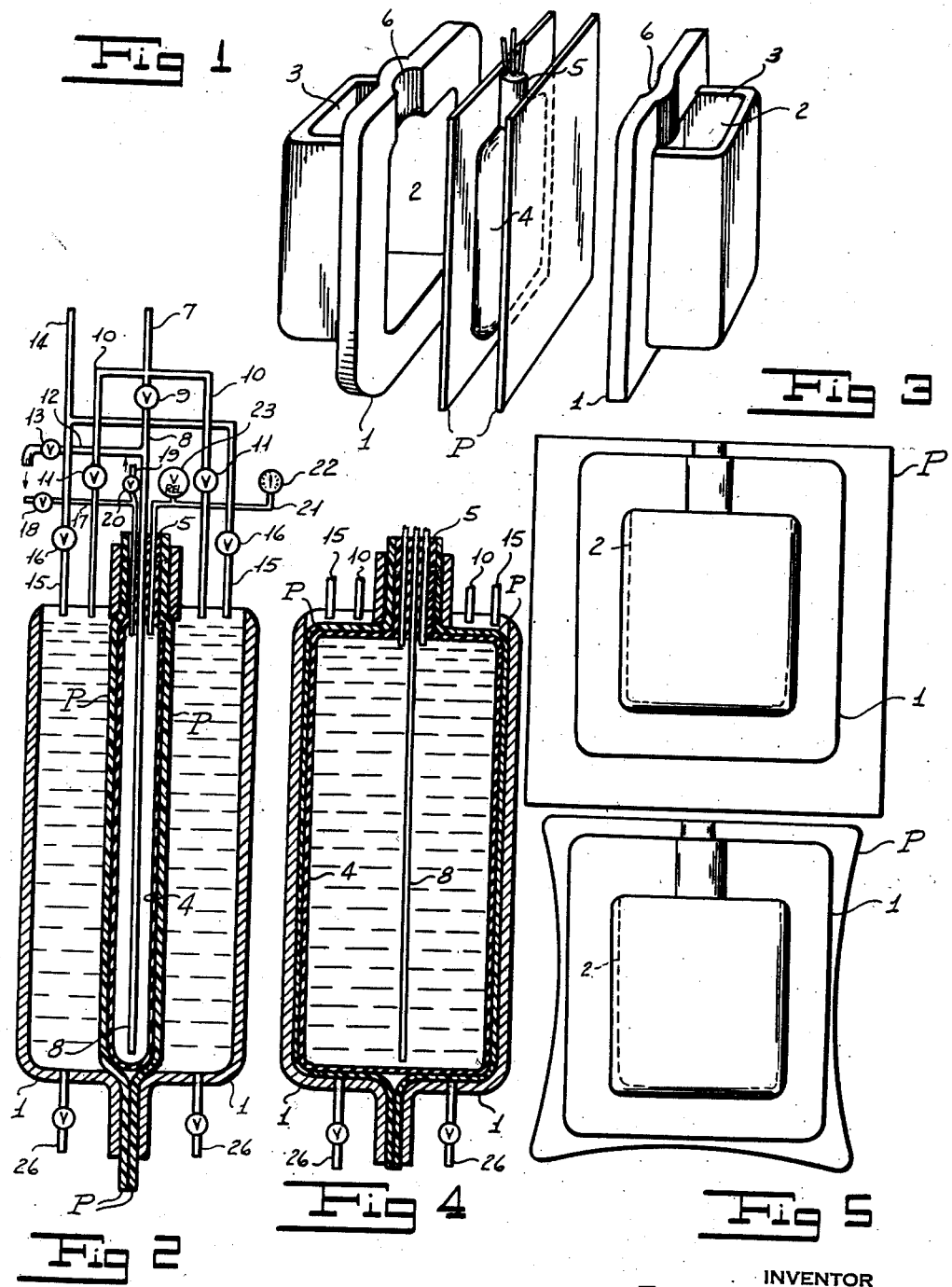
INVENTOR
JACK D. SARTAKOFF
BY
ATTORNEY Oct. 23, 1956    J. D. SARTAKOFF    2,768,106
METHOD OF MAKING A CARBOY
Filed Sept. 19, 1950    5 Sheets-Sheet 2
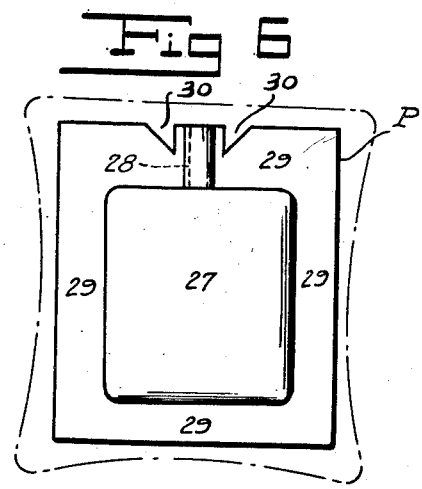
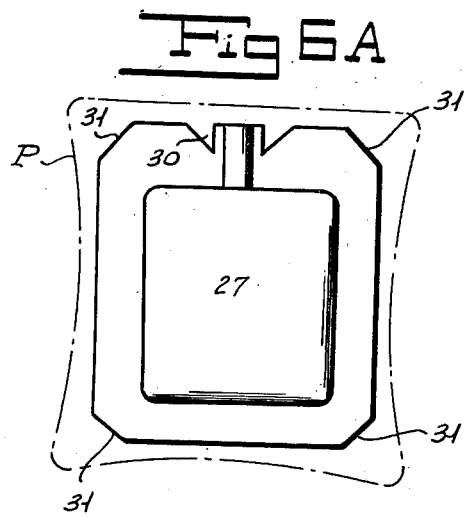
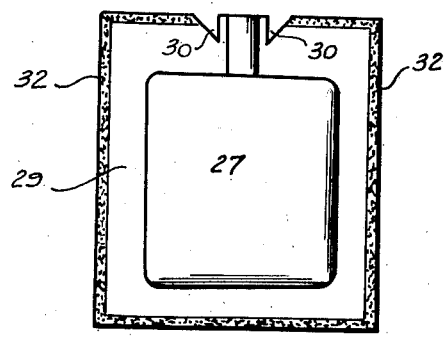
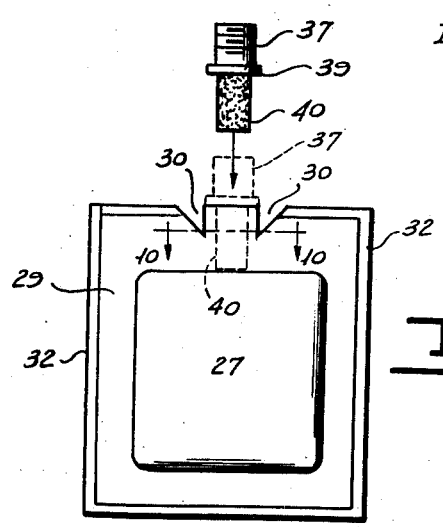
INVENTOR
JACK D. SARTAKOFF
BY Cornelius Zahustae
ATTORNEY Oct. 23, 1956  J. D. SARTAKOFF  2,768,106
METHOD OF MAKING A CARBOY
Filed Sept. 19, 1950  5 Sheets-Sheet 3
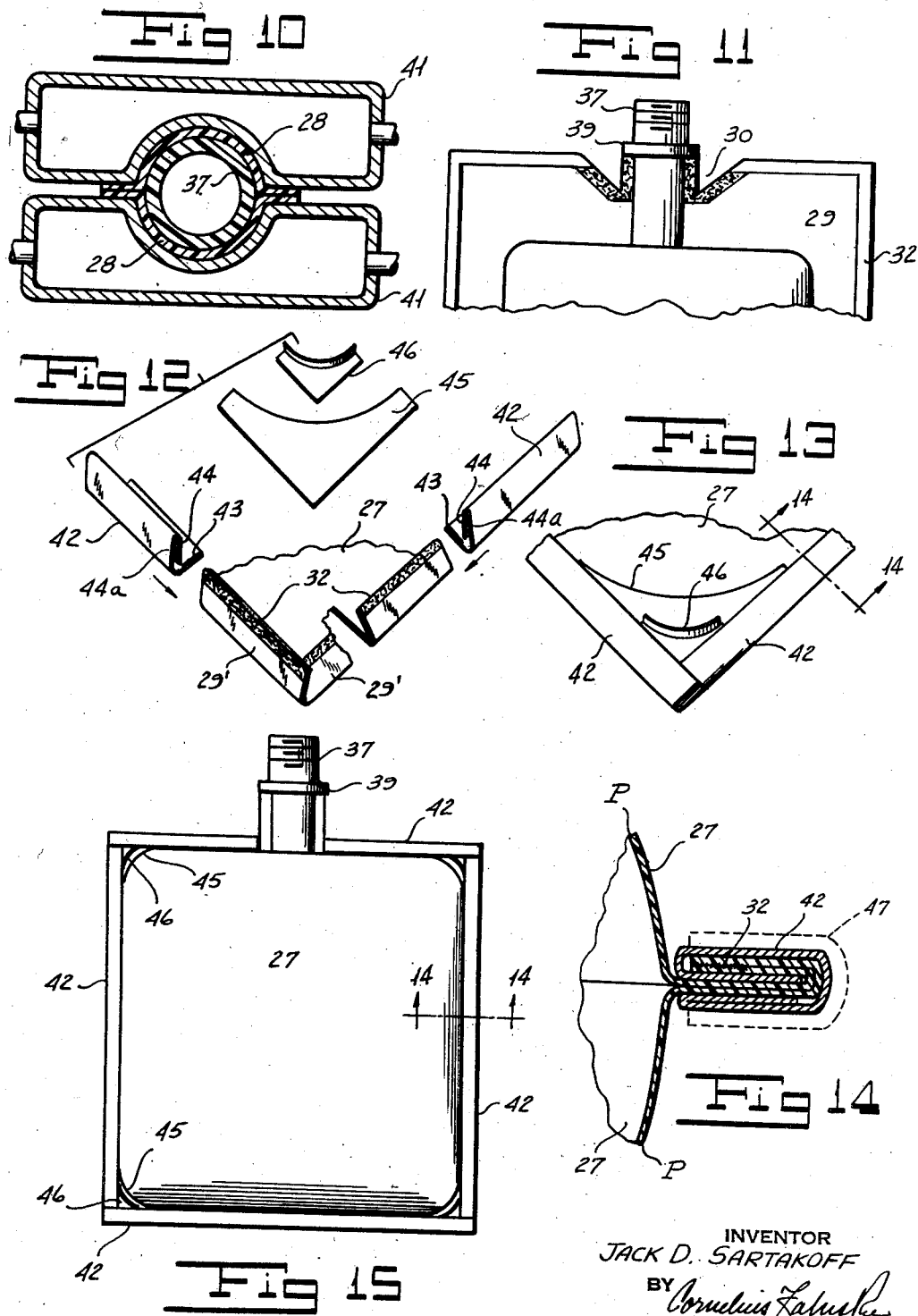
INVENTOR
JACK D. SARTAKOFF
BY
ATTORNEY Oct. 23, 1956  J. D. SARTAKOFF  2,768,106
METHOD OF MAKING A CARBOY
Filed Sept. 19, 1950  5 Sheets-Sheet 5
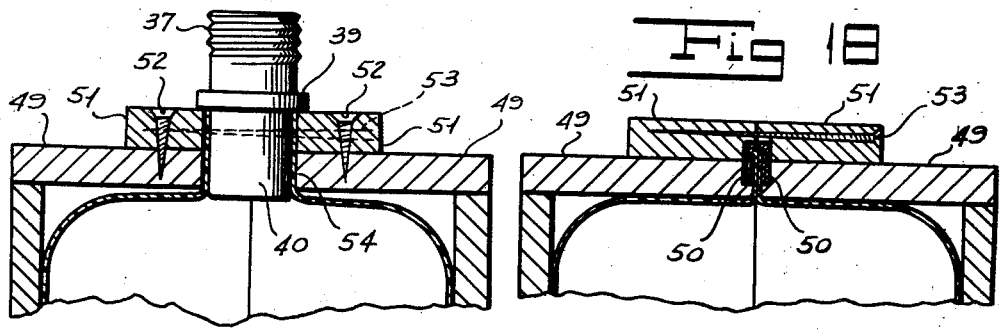
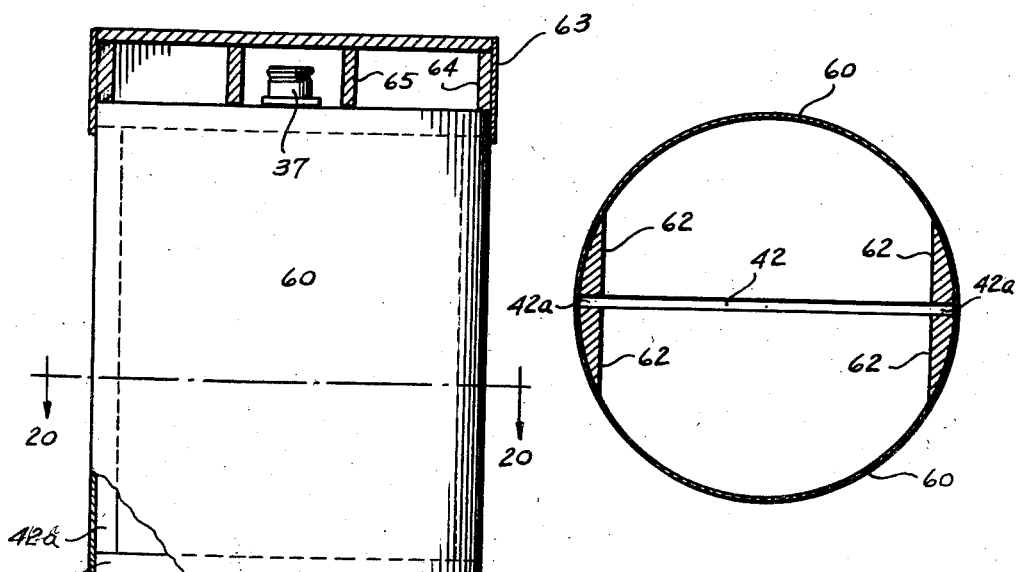
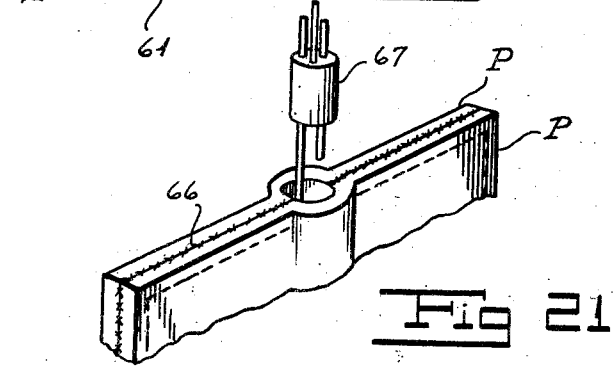
INVENTOR
JACK D. SARTAKOFF
BY Cornelius Zalaski
ATTORNEY

United States Patent Office 2,768,106
Patented Oct. 23, 1956

2,768,106

METHOD OF MAKING A CARBOY

Jack D. Sartakoff, Douglaston, N. Y.

Application September 19, 1950, Serial No. 185,600

12 Claims. (Cl. 154—83)

This invention relates to methods of making novel receptacles and containers adapted for a wide variety of purposes but, for the purpose of illustration, these methods are herein described in connection with the manufacture of carboys such as are used for the storage and shipment of acids, alkalis and other strong chemicals.

Heretofore carboys have universally been made in the form of glass bottles, with the body of the bottle housed within a wooden box or crate with the neck of the bottle projecting through an opening in the top of the crate. Various devices have been provided, usually in the form of wooden strips nailed to the top of the box, to cover and protect the neck of the bottle during shipment.

Glass bottle carboys are expensive to manufacture, are apt to become broken, are heavy to handle and involve relatively high transportation costs. There has long been an urgent need for a lighter, stronger, more durable and less expensive construction, but prior to the present invention no satisfactory substitute for glass has been found.

One object of the present invention is to provide a carboy wherein the container for the acids or other liquids is made from an organic plastic of non-friable character, so that it will not be broken by shocks which would splinter glass and will permit the manufacture of a carboy of very light weight as compared with the conventional glass bottle.

The problems of making a carboy container of organic plastic are numerous and difficult to overcome for there are only a relatively few organic plastics which are not attacked or destroyed by strong acids and alkalis and those few plastics which are suitable and resistant to such reaction are extremely difficult to fabricate into containers of sizes comparable to the sizes of conventional carboys. Polyethylene is such a plastic and, while it is possible to make very small containers, such as little bottles, of polyethylene by processes known to the art, it has been utterly impractical and impossible to make, by such processes, a bottle of this material large enough to function as a carboy. The problem therefore was to provide a method whereby a container of requisite size could be formed and to make this container sufficiently strong to withstand the rough handling to which carboys are subjected in use.

As a result of protracted experimentation and tests, I have been able to make such a container and an appropriate housing or crate therefor and thus fabricate a complete carboy which has satisfactorily withstood all tests required of conventional carboys and which is lighter, more economical and durable than the glass bottle carboys.

According to the preferred method of this invention, the container of the carboy is fabricated from two sheets of organic plastic which are clamped between two oppositely chambered molds and respectively expanded into the respective chambers of said molds, preferably by hydraulic pressure introduced between the sheets. The molds are clamped upon the sheets tightly enough to hold the molds together and yet permit the sheets, which are initially oversize, to creep through the joint between the molds and permit the expansion of the sheets into substantial conformation with the mold cavities without undue strain on any portion of either sheet. With this procedure, it is possible to make two sections, constituting the two lateral halves of a container, with the walls of both sections of substantially uniform thickness throughout and without strain or undesirable thinning at any particular portion of either section. In carrying out this shaping step, the liquid used as the hydraulic pressure medium may be at an elevated temperature to facilitate shaping of the plastic without undue strain or the sheets may be externally heated or both.

After the two sections of the container are formed as stated, surplus portions of the sheets which extend from the shaped areas thereof, are trimmed to leave fins of substantially uniform width and these fins are then marginally heat sealed to one another, and an appropriate tubular neck of the same or of a compatible organic plastic is heat sealed to the assembled sections.

Thereafter said fins are enclosed within a metallic binder which is bent a plurality of times to tightly clamp the fins together. The metallic binding is, prior to its application to the fins, preferably coated or otherwise covered with organic plastic resistant to strong acids and alkalis, so that even though these liquids are spilled over the exterior of the container, the metallic binding will be protected against attack or damage thereby.

The carboy container, fabricated as described, is preferably housed within a housing which may be of wood or any other appropriate material. This housing is internally slotted to receive the metallic bindings and apertured for the passage of the neck of the container. The housing, moreover, is so constructed as to grip and hold the neck against withdrawal into the interior of the housing and said housing is also provided with a neck guard of novel construction, hereinafter more fully described, which functions to protect the neck against contact with extraneous objects.

An important feature of this invention consists in the conjoint use of both the heat sealed joint or union and the metallic binding, so associated with one another that the former serves to produce a liquid tight joint, while the latter serves to bind sections together. Their relation should be such that the heat seal is within the confines of the binding and is protected thereby from the tension and other strains or stresses imposed by the liquid load in the container.

The reason for this relation is that the operation of heat sealing polyethylene and certain other plastics, tends or serves to change and, in some cases, destroy the normal "orientation" of the plastic structure and materially decrease its ability to withstand tearing and rupturing strains and stresses. Thus, while a satisfactory and durable liquid seal may be thus produced, it is a seal which, per se, lacks the necessary strength to confine a heavy body of liquid. This seal is, therefore, formed along the margin of the fins which project from the cavities of the sections and then the whole fin is wrapped within the metal binding which grips and holds those portions of the fin which are remote from and thus unaffected by the heat sealing operation and are consequently well able to carry the liquid load.

The metal binding may be made sufficiently strong to effectually bind the sections together, or it may be, in turn, enclosed within a channel to reinforce it. This channel may be formed in a box, crate or other appropriate housing or it may be in the form of metal channel section according to the use to which the container is to be put.

Another feature of this invention resides in the novel methods of heat sealing plastics, hereinafter described, whereby the effect of the applied heat is localized in the zones where the union is desired and not permitted to spread and weaken other portions or strata of the plastic sheets.

Features of the invention, other than those adverted to, will be apparent from the hereinafter detailed description and claims, when read in conjunction with the accompanying drawings.

The accompanying drawings illustrate different methods of making the carboy of this invention, but the showing thereof is to be understood as illustrative, only, and not as defining the limits of the invention.

Fig. 1 is an exploded perspective view showing two separate chambered molds, with two sheets of organic plastic between them, positioned on opposite sides of a collapsed distendable pressure bag.

Fig. 2 is a section through the same parts with the molds clamped together and with the pressure bag still collapsed.

Fig. 3 is a face view of the arrangement illustrated in Fig. 2.

Fig. 4 is a view similar to Fig. 2 but showing the condition of the parts with the bag distended to press the plastic sheets into substantial conformity with the mold cavities.

Fig. 5 is a side elevation of the parts at the conclusion of the method step of Fig. 4.

Fig. 6 is a face view showing how the formed sheet plastic sections appear after they have been removed from the molds and trimmed to size at their edges.

Fig. 6A shows a modified form of trimming with the corners cut off.

Fig. 7 shows the next step of heat sealing the margin of the fins at the edges of the plastic sections.

Fig. 8 shows one method of effecting this sealing while limiting the heating to the marginal peripheral portion of the fins.

Fig. 8A is similar to Fig. 8 but shows a modification of such method.

Fig. 9 shows the next step wherein the neck is heat sealed to the assembled sections.

Fig. 10 is a section taken at the line 10—10 of Fig. 9 showing how pressure is applied and the seal subsequently cooled during the step of Fig. 9.

Fig. 11 shows the step of heat sealing the fins of the two sections to one another in the region adjacent the neck.

Fig. 12 is an exploded view illustrating in perspective corner reinforcing inserts, the manner of preliminarily folding the fins for the reception of the metallic binder, and the mode of applying said binder.

Fig. 13 is also a perspective of one corner of the container with the parts of Fig. 12 in finished, assembled condition.

Fig. 14 is a section on the line 14—14 of Fig. 13 and Fig. 15.

Fig. 15 is a face view of the completed container.

Fig. 17 is a fragmental section on the line 17—17 of Fig. 16, but showing the container within the housing.

Fig. 18 is a like view on the line 18—18 of Fig. 16.

Fig. 19 shows the present invention as embodied in a cylindrical carboy. This view shows the cover and a part of the housing in central section.

Fig. 20 is a horizontal section on the line 20—20 of Fig. 19, with the container omitted.

Fig. 21 is a fragmental perspective showing a modified method of preliminarily peripherally sealing the plastic sheets together to render unnecessary the use of a pressure bag in the step of initially shaping these plastic sheets.

Figure 16:
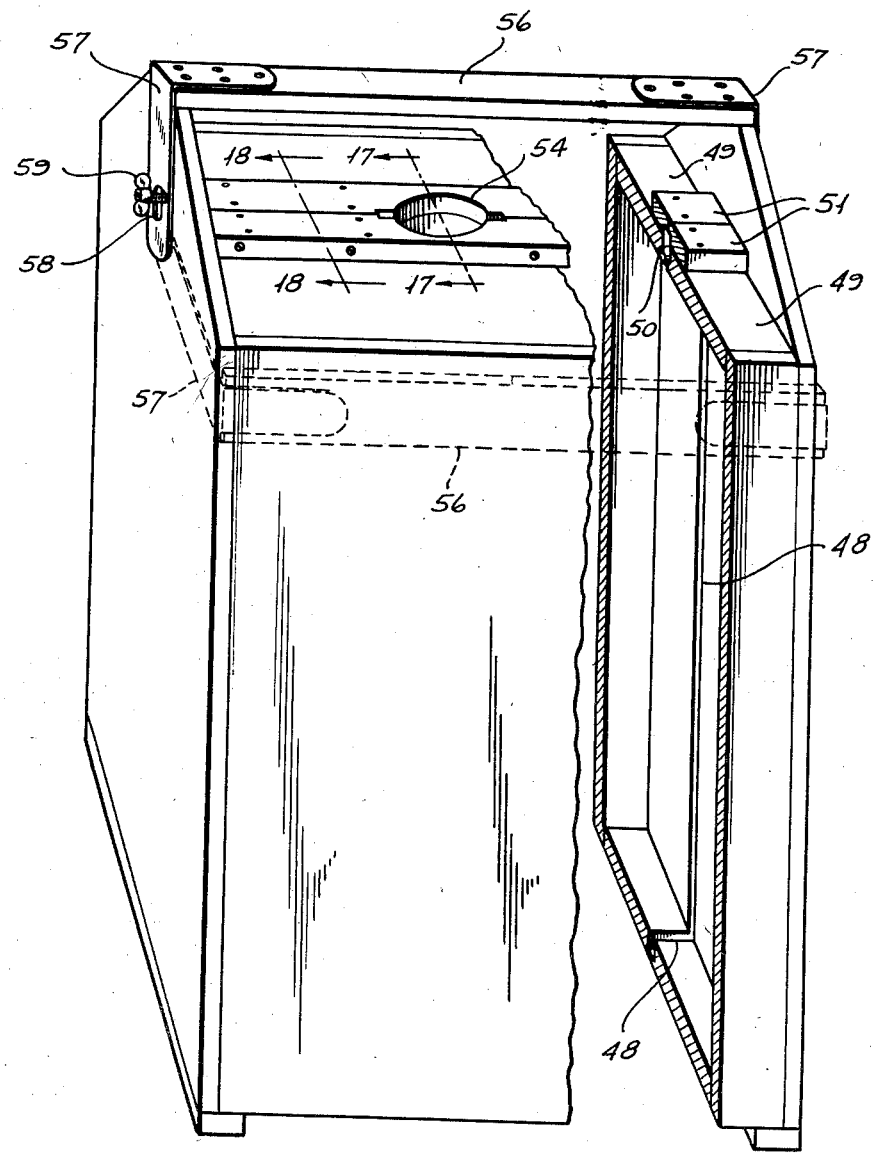
Fig. 16 is a perspective view of the wooden housing for the carboy container, certain parts being broken away to show adjacent parts in section.

The method as shown in the drawings is carried out through the use of a mold couple comprising two molds designated 1 in Fig. 1, and having chambers 2 with open tops 3. While the molds are separated, as shown in this figure, there is placed between them two sheets of organic plastic P. These sheets may be entirely separate from one another or they may be parts of a single sheet folded intermediate its ends. The sheets P are placed between the members of the mold couple and between these sheets is interposed a pressure bag 4 of any appropriate distendable material, such as rubber. The bag 4, when deflated, is of a size smaller than the mold cavities and is substantially flat. The sheets P are of overall size somewhat larger than the meeting flanges of the molds. The pressure bag is provided with a stoppered neck, 5, shown at its top in Figs. 1, 2 and 4, and the mold flanges are recessed at 6 to accommodate this neck.

The initial step in fabricating the container consists in clamping the plastic sheets and pressure bag between the molds by any appropriate clamping devices to produce the assembly shown in Figs. 2 and 3. When the parts are thus clamped together it will be noted from Fig. 3 that the sheets P project beyond the periphery of the mold flanges so as to provide extra material which may be drawn into the mold cavities as hereinafter more fully explained. The clamping is so regulated that the top flanges of the mold grip the plastic sheets tightly between them while the lateral and bottom flanges are not clamped so tightly in order to permit the corresponding portions of the sheets which extend beyond the flanges to creep inwardly to supply the stock necessary to provide the formed sections without undue strain or attenuation of the walls of the sheet stock.

As shown best in Fig. 2 the stopper of the neck 5 of the pressure bag is perforated for the passage of three tubes of a hydraulic-pneumatic tubing system. In this system, hot water at a sufficiently elevated temperature to soften the plastic and facilitate its shaping, may be fed under pressure through a supply tube 7 from any suitable source. This tube has several branches. One branch 8, valved at 9, extends downwardly through the stopper to substantially the base of the bag 4. Two other branches 10, valved at 11, extend into the upper open ends 3 of the mold chambers and the branch 8 is provided with a drawoff 12, valved at 13.

Cold water is supplied under pressure from a suitable source through a tube 14 which has two branches 15. These branches 15, valved at 16, lead to the open tops of the mold cavities. Compressed air may be fed through tube 17, valved at 18, and leading through the stopper to the interior of the pressure bag. This tube 17 has a vent 19 to the atmosphere and is valved at 20. Another tube 21 leads from the interior of the pressure bag through the stopper to a pressure gauge 22 and is connected to a pressure relief valve 23.

After the parts have been assembled as described and as shown in Fig. 2 (all of the valves of the hydraulic-pneumatic system being closed) the method proceeds as follows: Hot water is used to soften the plastic sheets. Such water may be introduced into the mold cavities as shown in Fig. 2 or these mold cavities may be left empty and hot water introduced only into the bag. To introduce the hot water into the mold cavities 2, the valves 11 are opened and these cavities are filled as shown in Fig. 2. The valves 11 are then closed. The valve 9 is then opened to allow hot water, under adequate pressure, to pass through the branch 8 into the interior of the pressure bag. The valve 20 is then opened to permit entrapped air to escape from the bag to the atmosphere through vent 19 and hot water is permitted to flow into the bag and cause same to be hydraulically distended.

As the bag distends, it forces the plastic sheets softened by hot water both interiorly and externally thereof, to substantially conform to the mold cavities 2 as shown in Fig. 4. The vent valve 20 is closed as soon as entrained air has been evacuated from the bag in order that hydraulic pressure may be applied to distend the bag as stated. As the bag is distended and the sheets conformed to the mold cavities, the hot water in said cavities exteriorly of the sheets is displaced and overflows the cavities 2 through the open tops 3 so that there is little if any water left in these cavities when the shaping of the plastic sheets has been concluded as shown in Fig. 4. Any water which may remain in these cavities may then be drawn off through valved drawoffs 26.

It will be noted from Fig. 3, that at the beginning of this forming step of the method, when the sheets are substantially flat, such sheets will extend very appreciably beyond the flanges of the molds. However, as the sheets are formed, portions thereof are permitted to creep into the space between the molds in order that a sufficient mass of material may autogenously creep into the mold cavities as may be required to effect proper shaping without undue stretching or thinning of the walls of the sheets. When the shaping operation is completed, it is found that considerable portions of the sheet have been drawn into the cavity with the result indicated in Fig. 5. This is an important consideration in the method of this invention because it permits of proper shaping of the sheets while maintaining the thickness of the walls thereof substantially uniform, whereby there are no thin or weakened zones which might tend to break under subsequent liquid loading.

After the sheets have been shaped as in Fig. 4, the valve 9 is closed. It is then necessary to set the sheets in shaped condition so that, when the hydraulic pressure is relieved, they will not tend to lose some of the shaping already imparted thereto. This may be accomplished in different ways. For example, cold water may be admitted into the mold cavities to flow over the exterior of the shaped sheets and cool them to setting temperature. If desired, however, a separate valved inlet tube may lead from the cold water supply into the interior of the pressure bag through the stopper of the latter so that cold water may be admitted directly into the pressure bag for the purpose stated, while the valve 9 is closed and the valve 13 open to permit the cold water to force the hot water out of the bag, the cold water being, in turn, forced out of the bag by compressed air admitted through tube 17.

In the event that the external cooling and setting is employed, cold water is permitted to flow into the cavities 2, while compressed air is introduced through the tube 17 by opening valve 18. The valve 13 being then opened, said compressed air will maintain the sheets in formed shape while they are being cooled and set and will also force all of the hot water out of the bag through the outlet tube 12. Meanwhile the gauge 22 will indicate the air pressure and the pressure relief valve 23 will act as a safety measure against the building up of excess air pressure.

After all of the water has been forced from the interior of the pressure bag, the valve 13 is closed and the compresed air condition within the pressure bag is maintained until the shaped plastic sheets have set. All of the valves are then closed and the valve 20 opened to vent the interior of the bag to the atmosphere and when this has been accomplished the formation and setting of the sheets is complete. The molds are then released from their clamped relation and are separated, the pressure bag removed and the shaped sheets withdrawn from the mold cavities. They will then appear as shown in Fig. 6 with their peripheral contour as indicated in dot and dash lines in this figure.

It will be noted from this figure that the sheets P have a shaped or chambered portion 27 surrounded by a peripheral fin at each of the four sides and with a neck opening 28 extending upwardly from the chambered portion. The fins of both sections are then trimmed from the dot and dash line form shown in Fig. 6 to the full line form illustrated in this figure to provide, around the four edges of the sheets, fins 29 of substantially uniform depth. The fins at the top of the sheets are notched at 30 adjacent each side of the neck opening for reasons which will be presently explained. These notches extend downwardly from the upper edges of the sheets to an elevation in spaced relation from the chambered portions 27. Fig. 6 shows the overall contour of the fins as of rectangular form although the corners may be cut off if desired as indicated at 31 in Fig. 6A. This is optional.

After the sheets are trimmed as stated, they are placed with their fins in face abutting relation and are marginally heat sealed to one another throughout their entire periphery except at and between the notches 30. This heat sealing is designated 32 in Fig. 7, the stippled portion indicating the extent of the heat sealed zone. It will be noted in this figure that this heat sealed zone is at the very periphery of the formed sheets and that it is relatively narrow so that an appreciable width of the fins is left between the heat sealing and the chambered portion 27 for reasons hereinbefore explained.

The limitation of the heat sealing to this particular zone is important and Figs. 8 and 8A show two ways in which such limitation may be accomplished. Fig. 8 shows two wooden clamping forms 33, the outer surface of which are faced with metal sheeting 34 having contiguous flanges 35. Directly back of these flanges are pipes or chambers 36 through which a cooling medium, such as cold water, may be circulated. The fins 29 of the two sections are adapted to be clamped between the clamping forms 33 with the fins extending to the outer edge of the flanges 35. After the clamps have been tightly secured in the position shown in Fig. 8, heat is applied to the flanges 35 in any suitable manner. A Bunsen burner may be used for this purpose or the flanges may be electrically or otherwise heated to a temperature sufficient to heat seal those portions of the fins which lie between the flanges 35. The cooling fluid referred to, as well as the wooden character of the clamping forms, serve as a barrier against the creeping of the heat to the remainder of the width of the fins and thus limit the heat sealing to that portion of the fins which lies between the flanges.

Fig. 8A shows similar wooden clamping forms 33a with flanges 35a set into the clamping forms and backed up by strips 36a of poor conductivity metal or other material so as to serve as a barrier against creeping of the heat.

By localizing the heat sealed zone in the manner stated, or in any other appropriate way of blocking the transmission of such heat to the remainder of the fins, the character or orientation of the plastic structure is restricted to the zone which is heat sealed, while the orientation of the remainder of the width of the fins remains unchanged and in its original tenacious condition.

The heat sealing described joins the sections throughout their entire periphery except at the notches and at the neck opening, as indicated in Fig. 7. These latter portions are left unsealed to facilitate the attachment of a tubular neck such as indicated at 37 in Fig. 9. This neck may be of any appropriate shape but it is shown as cylindrical, with a collar 39 about midway of its length. Above the collar, the neck is screw threaded to receive a cap while that portion 40 below the collar is adapted to be secured within the neck opening of the assembled plastic sections. The heat sealing of this portion 40 to said sections proved for a long time a very troublesome problem. The difficulty was to heat seal these parts together without seriously changing orientation of the relatively thin sheets to which the neck must be attached. However, the present invention solves this problem in the following manner: The neck is made of tubular stock with a relatively thick wall. This tubular stock is thus sufficiently heavy to permit the exterior cylindrical surface strata of the portion 40 to be partially fused by the application of heat, without fusing the plastic through the entire thickness of the wall. Its exterior is thus heated until its surface strata is fused while the underlying portion remains unfused and unaffected by the heat employed. While the portion 40 is in this heated, fused condition it is thrust into the neck opening of the assembled sheets as indicated in dotted lines in Fig. 9. The neck portions of said sections are then immediately gripped between the jacketed clamps 41 as shown in Fig. 10. The heat of the surface fused section 40 has been found to be enough to fuse the contiguous strata of the neck portions of the sheets sufficiently to affect the proper bond through consolidation and coalescence of the abutting strata without, however, detrimentally affecting the remainder of the thickness of the sheets. As soon as the parts have coalesced, a cooling fluid is passed through the jackets of the clamps 41 and serves to immediately arrest the fusion of the parts and set them in a permanent joint.

The clamps 41 are then removed and those portions of the fins bounding shaped notches 30 are then heat sealed, as shown in Fig. 11, using the technique described in conjunction with Figs. 8 or 8A. The step of Fig. 11 may be carried out previous to the attachment of the neck 37 but it is found that the neck may be more readily attached if the sealing shown in Fig. 11 is subsequently performed.

Next comes the metal binding of the assembled heat sealed sections. This is accomplished by first bending over or returning a portion of the width of the fins upon themselves as shown at 29' in Fig. 12. Approximately one-half of the width of the fins is thus returned upon the remaining half, with the bent fins overlapping one another at the corners as shown. This folding is appropriate to the rectangular fin shape shown in Fig. 6. If the fin shape is as shown in Fig. 6A, the bindings are mitred at the corners and turned in so that the mitred edges meet at each of the eight corners.

After the fins are bent as shown in Fig. 12, metal bindings 42 are then slipped edgewise over the bent fins, as indicated in the arrows in this figure. Each of these bindings is preferably first bent intermediate its width into a substantially V-shaped section and each flange of the V-shaped section is returned upon itself. The portions of the flange 43 are bent down into face abutting relation. The other flange 44 is bent to form an open groove 44a, adapted to fit over the bent back portion of the corresponding heat sealed fins. Before applying the binding it is preferably dipped into or otherwise covered with an inert film forming coating material or housed within a sheath of a material which will protect the metal binding from corrosion or attack by strong acids or alkalis.

After the bindings have been slipped edgewise over the fins to receive the heat sealed margins thereof into the grooves 44a, said bindings are subjected to pressure to bend the flanges thereof into tight gripping relation with the fins. Each corner may be reinforced by inserting at each side of the container one or more gussets 45 and 46, the former of which is preferably an organic plastic and the latter of which is preferably a metallic stamping with a suitable protective coating against corrosion and attack by acids, etc. When the binding is clamped tightly, it grips these gussets at the corners and anchors them firmly in position.

Fig. 14, a section on the line 14—14 of Figs. 13 and 15, shows very clearly how the metal binding serves to take actual stresses and strains which may be imposed by the liquid load in the container and at the same time house the heat seal 32 within the confines of the binding at some little distance from the point where the liquid load is carried. When the sections are thus secured together and reinforced, the binding itself will in a large measure preclude leakage into the joint between the fins and any liquid which may seep along the joint to the heat seal will be effectively arrested by such seal.

The container thus far described may be used complete in this form. If it is desired to reinforce the binding it may be enclosed within a channeled section 47, indicated in dotted lines in Fig. 14, but under ordinary conditions this is unnecessary. When this container is used as a container of a carboy, such carboy is so constructed as to contain channels for the reception of the metal bindings and the walls of these channels will serve to reinforce the bindings even when such bindings are made from relatively thin stock.

Two illustrative forms of carboy housing which may be employed, are shown in Figs. 15 through 20. Figs. 15–18 show a rectangular form. In this instance, the structure is preferably in the form of a wooden box provided at its ends and across its bottom with channels 48 to receive the metal binding 42. The top wall of the box is made of two sections 49, the contiguous edges of which are rabbited at 50 so as to embrace the opposite faces and lower edges of the binding. Battens 51, the contiguous edges of which are similarly rabbited but in an inverted manner, abut the opposite faces and cover the upper edges of the bindings at the top of the container. These battens are secured to the top wall 49 of the box housing by screws 52, as shown best in Fig. 17, and they are secured to one another by screws 53, as shown best in Fig. 18. This latter figure shows very clearly how the binding at the top of the container is housed within the wooden parts of the box and thoroughly reinforced thereby. The neck of the container extends through the opening 54 in the top of the box, with its fixed collar 39 or other appropriate abutment resting on the upper surface of the battens 51, whereby the neck is precluded from receding into the interior of the housing.

As shown in Fig. 16, the end walls of the box are extended upwardly to a point above the top of the container neck and a protection bar 56, of wood or other suitable material, is secured at its opposite ends to brackets 57. In the upright portions of these brackets are formed inverted L-shaped slots 58 through which thumb screws 59 are passed and threaded into the end walls of the housing. When the bar 56 is in the full line position shown in Fig. 16 with the horizontal portion of the slots 58 embracing the shank of the thumb screws, these screws may be tightened to lock the bar in this position and thus protect the neck against contact with extraneous objects. When these thumb screws are loosened the brackets may be shifted slightly to register the vertical portions of the slots 58 therewith, whereupon the brackets and bar may be swung downwardly into the dotted line position of Fig. 16 to render the screw cap of the container neck accessible.

The structure of Figs. 19 and 20 is a carboy of cylindrical form. In this instance the container is made circular instead of in the form hereinbefore described. This may be readily accomplished by merely changing the shape of the mold cavities. This circular container is received within a cylindrical housing 60 which may be conveniently made of plywood with a solid bottom 61 and a top, constructed in the same general manner as in Figs. 17 and 18 but of circular form. In this case strips 62 are secured in upstanding spaced relation interiorly of and at opposite sides of the housing, as shown best in Fig. 20, to provide between them channels 42a and the bottom 61 is provided with a registering diametric slot 42 to receive the bindings of the container.

Any appropriate cover may be provided for a carboy of this latter type such, for example, as the slip cover 63 shown in Fig. 19 which has an internal annular reinforcing ring 64 and reinforcing battens 65 to impart added strength to the cover and to permit the stacking of such carboys one upon the other for compact storage or shipment. Appropriate catches may be used to secure the cover to the body of the housing.

The initial formation or shaping of the plastic sheets to provide the chambers or cavities 27 therein has been hereinbefore described as accomplished by use of a pressure bag. This formation of the sheets may, however, be carried out without such a bag. This may be done by initially marginally heat sealing the sheets to one another, as indicated at 66 in Fig. 21, and clamping a temporary stopper 67 into the open space left at the top of the sheets. This assembly constitutes in itself a bag which may be clamped, as hereinbefore described in connection with Figs. 2 and 4, between the molds and the method of this invention thereupon carried out as before except that the hot water is introduced directly into the space between the sheets. When this system is used the clamping of the molds together will hold sufficient hydraulic pressure to permit of shaping of the sheets as hereinbefore described, although the use of a separate pressure bag is preferred. When the practice of Fig. 21 is employed the heat sealing 66 is cut away after the sheets are shaped and heat sealing corresponding to that indicated at 32 in Fig. 7 is carried out as previously stated.

In the foregoing detailed description, reference has been made primarily to the employment of polyethylene as the plastic employed for this plastic is peculiarly adapted for use in carboys which are to contain strong acids and alkalis. I am aware of no prior procedure which makes it possible to employ this plastic for the purpose stated for, while the plastic may be heat sealed, heat sealing is not enough for when heat sealed its strength in the zone of such sealing is seriously impaired. The illustrative showing hereinbefore made illustrates how this plastic may be satisfactorily employed. I am aware, however, that other plastics susceptible to heat sealing may be availed of without departing from this invention.

Disclosure herein made includes numerous features of novelty some of which may be employed without necessarily employing all. The invention is therefore to be understood as not limited to all of these features or to the particular method step sequences or apparatus employed in carrying out the methods described. The present invention is therefore to be understood as full commensurate with the appended claims.

Having thus fully described my invention, what I claim as new and desire to secure by Letters Patent is:

1. The method of making a container which comprises: bringing into registration the chambered portions of two plastic container sections with flat fins which border the chambered portions in initial contact, heat sealing portions of the fins remote from said chambered portions while leaving the greater part of the remaining portions of the width of said fins unsealed and unaffected by the heat of such sealing and also leaving an unsealed neck opening between the fins, and thereafter enclosing said remote heat sealed portions of the fins as well as the greater portion of the said unaffected width of said fins within a metallic binder with both the fins and the binder returned upon themselves in spaced relation to said remote heat sealed portions of the fins and the chambered portions of said sections.

2. The method of claim 1 which includes a further step of sealing a separate neck to the fins in the neck opening.

3. The method of claim 1 wherein the said remote portions of the fins are the marginal portions of said fins.

4. The method of claim 1 which includes the additional step of thereafter enclosing the metal binder within a close fitting channel.

5. The method of claim 1 wherein the plastic is polyethylene.

6. The method of making a container which comprises: bringing into registration the chambered portions of two plastic container sections with fins bordering the chambered portions in facial contact, heat sealing the marginal portions only of said fins to one another while the heat sealed marginal zone is localized by blocking the transmission of heat therefrom to the remainder of the width of the fins, and thereafter enclosing such heat sealed marginal portions of the fins as well as the greater portion of the width of said fins within a metallic binder.

7. The method of claim 6 wherein both the fins and the metallic binder are returned upon themselves in spaced relation to both the sealed marginal zone of the fins and the chambered portions of the container sections.

8. The method of making a container which comprises: bringing into registration the chambered portions of two plastic container sections with flat fins bordering the chambered portions into facial contact, uniting the marginal portions of said fins but leaving a neck opening between said sections, exteriorly heating a portion of the tubular neck until only the surface strata thereof is fused, introducing the surface fused portion of the neck while said strata remains in fused condition into the neck opening between said sections, applying pressure to said sections about the neck opening until the heat of the fused strata of the neck has fused the contiguous strata of the sections at the neck opening and effected a coalesced union between contacting portions of the neck and sections.

9. The method as claimed in claim 8 which includes the additional step of cooling all of said fused portions before fusion can penetrate the thickness of the sections at the neck opening.

10. The method of making a container which comprises: bringing into registration the chambered portions of two plastic container sections with flat fins bordering the chambered portions into facial contact, thereafter heat sealing the marginal portions of the fins to one another while leaving the remainder of the width of the fins in unsealed condition and also leaving a neck opening, heat sealing the neck to the opposing fins at said opening, introducing the heat sealed margins of the fins into a groove in a metal binding and in which groove the heat sealed margin is completely received, thereafter closing said groove, and thereafter conjointly bending the remainder of the width of the binding and the fins remote from the heat sealed margin thereof to further clamp and grip the fins within the binding.

11. The method of claim 10 which includes the additional step of bringing a channel into position to embrace the binding to reinforce the latter.

12. The method of claim 10 which includes the additional step of enclosing the container within a housing provided with channels to receive the bound edges of the container.

References Cited in the file of this patent

UNITED STATES PATENTS

| | | |
|---|---|---|
| 761,890 | Kepler | June 7, 1904 |
| 1,452,039 | Gravell | Apr. 17, 1923 |
| 1,518,194 | Gravell | Dec. 9, 1924 |
| 1,841,265 | Husa | Jan. 12, 1932 |
| 1,962,900 | Hirsch | June 12, 1934 |
| 2,083,479 | Speare | June 8, 1937 |
| 2,152,467 | Crosby | Mar. 28, 1939 |
| 2,221,470 | Brown | Nov. 12, 1940 |
| 2,289,618 | Young | July 14, 1942 |
| 2,404,766 | Hanson et al. | July 23, 1946 |
| 2,435,251 | Tome | Feb. 3, 1948 |
| 2,438,685 | Stevens | Mar. 30, 1948 |
| 2,441,778 | Traver | May 18, 1948 |
| 2,478,121 | Morner | Aug. 2, 1949 |
| 2,488,212 | Lloyd | Nov. 15, 1949 |
| 2,494,905 | Schumann | Jan. 17, 1950 |
| 2,569,534 | Netz | Oct. 2, 1951 |
| 2,581,763 | Hickler | Jan. 8, 1952 |
| 2,584,632 | Southwick | Feb. 5, 1952 |
| 2,620,944 | Stahl | Dec. 9, 1952 |
| 2,702,034 | Walter | Feb. 15, 1955 |

FOREIGN PATENTS

| | | |
|---|---|---|
| 272,608 | Great Britain | June 17, 1927 |